United States Patent
Bevan et al.

(10) Patent No.: US 7,483,408 B2
(45) Date of Patent: Jan. 27, 2009

(54) SOFT HANDOFF METHOD FOR UPLINK WIRELESS COMMUNICATIONS

(75) Inventors: David Damian Nicholas Bevan, Bishops Stortford (GB); Julius G Robson, Dunmow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 496 days.

(21) Appl. No.: 10/180,609

(22) Filed: Jun. 26, 2002

(65) Prior Publication Data

US 2004/0001460 A1    Jan. 1, 2004

(51) Int. Cl.
*H04Q 7/00*    (2006.01)
*H04Q 7/20*    (2006.01)
*H04B 1/38*    (2006.01)
*H04M 1/00*    (2006.01)

(52) U.S. Cl. .................. 370/331; 370/332; 370/333; 455/436; 455/442; 455/561

(58) Field of Classification Search ......... 455/436–451, 455/137, 432.1, 432.3, 433–434, 452.1–452.2, 455/453, 550.1, 556.2, 560–561, 62, 517, 455/524–526; 370/335, 342, 328–333, 338–341, 370/310, 343–345; 375/316, 340, 267, 347

See application file for complete search history.

(56) References Cited

U.S. PATENT DOCUMENTS

| | | | |
|---|---|---|---|
| 4,369,520 A * | 1/1983 | Cerny et al. | 455/137 |
| 5,539,749 A | 7/1996 | Eul | |
| 5,987,333 A * | 11/1999 | Sole | 455/522 |
| 6,064,338 A * | 5/2000 | Kobayakawa et al. | 342/378 |
| 6,157,668 A | 12/2000 | Gilhousen et al. | |
| 6,192,038 B1 * | 2/2001 | Wallerius et al. | 370/328 |
| 6,661,853 B1 * | 12/2003 | Agami et al. | 375/340 |
| 6,690,944 B1 * | 2/2004 | Lee et al. | 455/522 |
| 6,714,788 B2 * | 3/2004 | Voyer | 455/453 |
| 6,792,267 B1 * | 9/2004 | Backstrom et al. | 455/422.1 |
| 2003/0021246 A1 * | 1/2003 | Ling | 370/334 |

(Continued)

FOREIGN PATENT DOCUMENTS

WO     WO 95/32594     11/1995

OTHER PUBLICATIONS

XP010166893—Bottomley G E et al: "Adaptive Arrays and MLSE Equalization"—Vehicular Technology Conference, 1995 IEEE. July 25, 1995, pp. 50-54.

*Primary Examiner*—Meless N Zewdu
(74) *Attorney, Agent, or Firm*—Barnes & Thornburg LLP

(57) ABSTRACT

Soft-handoff methods involve receiving an uplink signal from a user equipment at more than one basestation. The uplink signals are processed at each basestation before being backhauled to a common point for use to derive a single signal from the user equipment. One problem with previous types of soft-handoff methods is that relatively complex processing is required at each basestation in order to demodulate and decode the signals. It is also desired to further increase uplink capacity as compared with known types of soft-handoff methods. This is achieved by backhauling signals without carrying out any decoding of the uplink signal at the basestation. The backhauled signals are combined at a common point using maximal ratio combining before being fully demodulated and decoded. As a result capacity is increased and required user equipment transmit power is reduced.

12 Claims, 7 Drawing Sheets

U.S. PATENT DOCUMENTS

| | | | |
|---|---|---|---|
| 2003/0022636 A1* | 1/2003 | Ylitalo et al. | 455/101 |
| 2003/0027540 A1* | 2/2003 | Da Torre | 455/277.1 |
| 2003/0036410 A1* | 2/2003 | Judd et al. | 455/561 |
| 2003/0081538 A1* | 5/2003 | Walton et al. | 370/206 |
| 2003/0147343 A1* | 8/2003 | Onggosanusi et al. | 370/209 |
| 2003/0171118 A1* | 9/2003 | Miya | 455/442 |

* cited by examiner

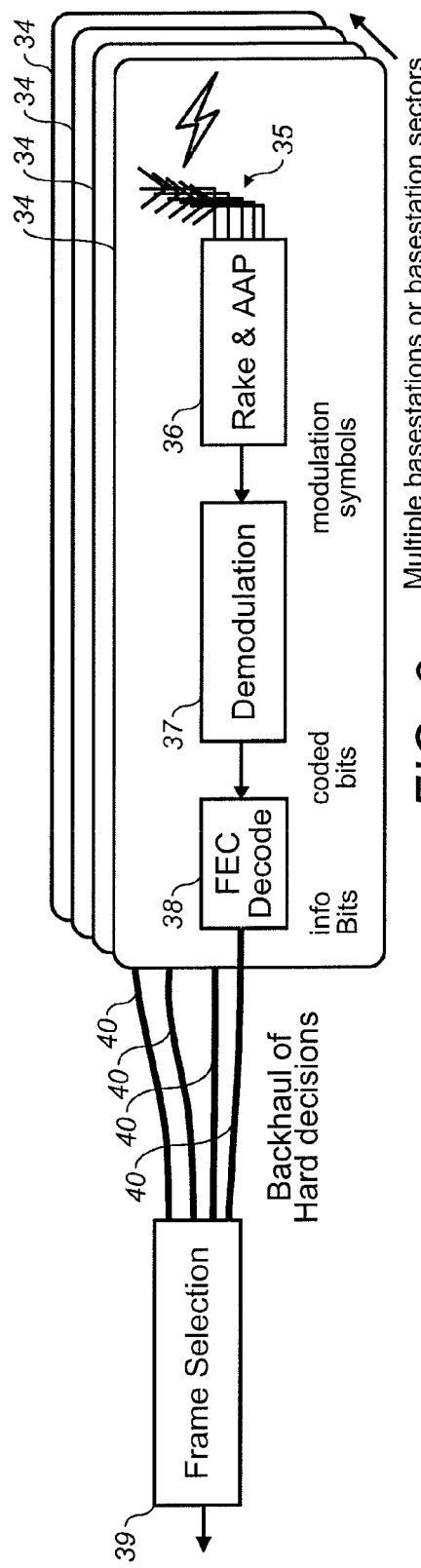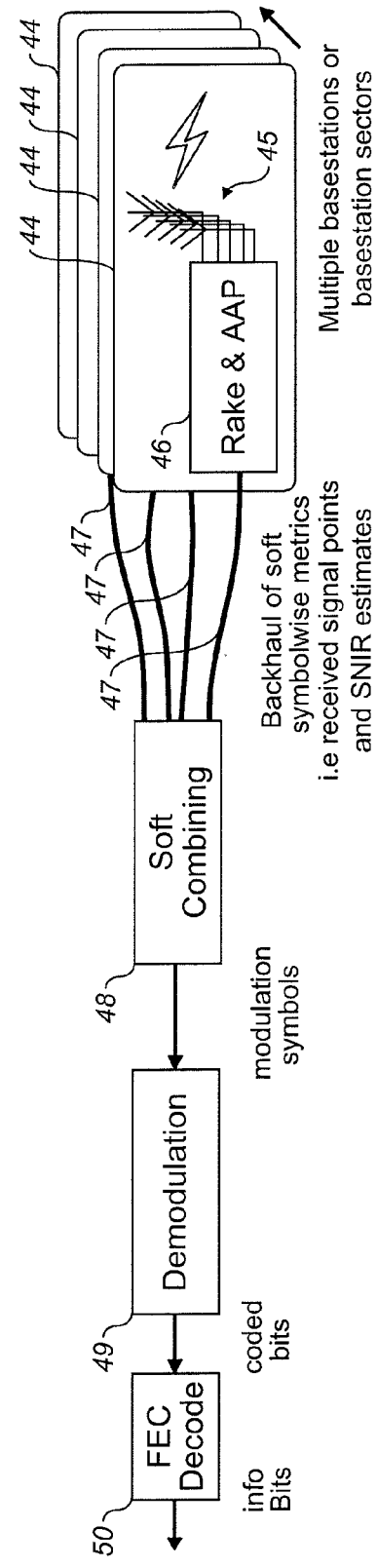
FIG. 3 PRIOR ART
FIG. 4

SOFT HANDOFF METHOD FOR UPLINK WIRELESS COMMUNICATIONS

FIELD OF THE INVENTION

The present invention relates to a method and apparatus for receiving backhauled communications signals and also a method and apparatus for backhauling uplink communications signals. The present invention is particularly related to soft handoff methods in wireless communications.

BACKGROUND TO THE INVENTION

As known in the art, wireless communications networks are typically formed from a plurality of basestations (also referred to as base transceiver stations, BTSs), each basestation being located in a cell which is a geographical region served by that basestation. User terminals, also referred to as user equipments (UEs), are able to communicate with one or more of the basestations using wireless communications.

Previously many wireless communications networks have used so called "hard handoff" schemes whereby an uplink signal from a UE to a basestation is only actioned at one of the basestations. That is, the uplink signal is only demodulated and decoded at a single "best" cellsite or basestation. Thus, the uplink signal from a UE only results in communication at one of the basestations. As a UE moves, for example, a mobile phone in a car that is travelling, the UE may move between cells and be "handed off" from uplink communication with one basestation to uplink communication with another basestation.

It has also been recognised that uplink signals from one UE are often received by a plurality of different basestations (or sectors at the same basestation) in a wireless communications network, and that by making use of the signals received at two or more of those basestations (or sectors), improved uplink communication is achieved. For example, FIG. 1 is a schematic diagram of a wireless communications network comprising a plurality of basestations 10 each within a tri-sectored cell 11. (In FIG. 1 the sectors are represented by hexagonal shapes.) A plurality of UEs are shown, each represented by a dot 12. Two uplink signal paths from most of these UEs 12 are represented by lines, each to a different basestation 10. The darker of the two lines is intended to represent the uplink signal path giving the stronger signal received at the basestation.

Thus more recently, "soft handoff" schemes have been used and are part of the IS95 standard. In such "soft handoff" schemes the uplink signal is separately demodulated and decoded on a frame-by-frame basis at multiple basestations. The hard-decoded frames (i.e. containing a 1 or 0 in each bit position) from these basestations are then backhauled (communicated in some way) to a common point. This is illustrated schematically in FIG. 2a which shows three basestations 20 each in a tri-sectored cell. A user equipment, in this case a mobile telephone handset 21 is shown with four uplink communication paths indicated by arrows 1 to 4. Arrows 1, 2 and 4 show paths to different basestations whereas arrows 1 and 3 show paths to different sectors of the same basestation. The degree of soft handoff is said to be 4-way because four different uplink paths are used. Each of the basestations demodulates and decodes the uplink signal received from the UE 21. The resulting hard-decoded frames are then backhauled to a common point 22 as indicated by arrows 23, 24, 25.

For example, the common point is typically a selector bank subsystem (SBS) of a base station controller (BSC). A processor at the common point then selects the "best" of the hard-decoded frames received from the different cell sites and discards the rest. For example, the SBS chooses as the single survivor frame (for vocoder decode) one of the backhauled set (if possible) with a correct cyclic redundancy check (CRC) (i.e. a CRC which correctly corresponds to the decoded data). In this way improved uplink communication is achieved (as compared with hard handoff) but at the expense of carrying out extra processing at the basestations, providing and carrying out the backhaul communication and carrying out the additional processing at the common point.

mDiversity Inc. describe a variation on this soft handoff scheme in their U.S. Pat. Nos. 6,349,094 and 6,192,038. They describe a plurality of collectors (similar to basestations) distributed at macro-diverse locations for receiving reverse channel (uplink) signals from users. Each of the collectors processes the uplink signals to yield one or more sequences of data bits as a burst and corresponding initial confidence metrics for each bit. The collectors forward the data bits and confidence metrics to an aggregator or common point. At the aggregator the data for the same user received from the multiple collectors is combined by using the confidence metrics to make a final decision on each bit.

One problem with previous types of soft-handoff methods is that relatively complex processing is required at each basestation in order to demodulate and decode the signals.

It is also desired to further increase uplink capacity as compared with known types of soft-handoff methods.

An object of the present invention is to provide an improved soft-handoff method which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to an aspect of the present invention there is provided a method of receiving backhauled communication signals in a wireless communications network said method being carried out at a combiner node (such as a selector bank subsystem of a basestation controller) in the communications network. The method comprises the step of:
receiving backhauled encoded signals from a plurality of basestations in the communications network, said backhauled encoded signals being formed from at least some signals from the same user equipment; and wherein said backhauled signals have not undergone decoding prior to reception at said node.

The term "basestation" is used here to include basestation sectors. For example, the backhauled signals can be from two different sectors of a particular basestation. For, example, the backhauled signals are forward error correction (FEC) encoded. Because the backhauled signals are not decoded at the basestations the complexity of processing required at those basestations is reduced. Also, that process of decoding involves the loss of some information and the present invention enables that information to be retained and used at the combiner node. This is explained in more detail below.

Preferably the backhauled encoded signals are modulated and have not undergone demodulation prior to reception at said node. This is advantageous because the processing required at the basestations is further reduced. However, in another embodiment, some demodulation is carried out at the basestations. For example, in a preferred case the backhauled encoded signals comprise received signal values, and also signal-to-noise and interference-ratio estimates.

Preferably the method further comprises combining each backhauled encoded signal received from a basestation in respect of the same user equipment by using maximal ratio combination to produce one backhauled encoded signal. This is advantageous because all the backhauled information is used to carry out the combination process and produce one encoded signal. This signal can then be demodulated and decoded.

According to another aspect of the present invention there is provided a method of backhauling uplink communication signals received from a user equipment in a wireless communications network said method being carried out at a basestation in the communications network. The method comprising the steps of:

receiving uplink encoded, modulated signals from a user equipment in the communications network; and backhauling signals formed from said received signals to a specified node in the communications network without first decoding said received signals.

For example, in one embodiment the received signals are simply backhauled without being modified in any way. However, in another embodiment the received signals are partly processed, but without being decoded, before being backhauled. In both these cases information that would otherwise have been lost at the basestation during a decoding process is retained.

In a preferred example the signals for backhauling are formed by processing the received uplink signals at the basestation in order to produce received signal values. In addition, processing to produce signal-to-noise and interference-ratio (SNIR) values can be done at the basestation. This provides the advantage that these values are relatively simple to compute and yet retain information which can be used later at a combiner node. For example the received signal values and SNIR values are produced subsequent to rake filtering and antenna array processing (AAP) processing.

The invention also encompasses a basestation for backhauling uplink communication signals received from a user equipment in a wireless communications network said basestation comprising:

a receiver arranged to receive uplink encoded, modulated signals from a user equipment in the communications network;

an output arranged to backhaul signals formed from said received signal to a specified node in the communications network without first decoding said received signals.

According to another aspect of the present invention there is provided a combiner for receiving backhauled communication signals in a wireless communications network said combiner being provided at a node in the communications network and comprising:

an input arranged to receive backhauled encoded signals from a plurality of basestations in the communications network, said backhauled encoded signals being formed from at least some signals from the same user equipment; and wherein said backhauled signals have not undergone decoding prior to reception at said node.

The invention also encompasses a communications network comprising a plurality of basestations as described above and preferably also at least one combiner as described above.

Also, a computer program arranged to carry out the methods described above are provided.

According to another aspect of the present invention there is provided a signal for backhauling from a basestation in a wireless communications network to a combiner node in the communications network, said signal being formed from an uplink encoded, modulated signal from a user equipment, without decoding said signal.

Preferably the signal comprises the full uplink encoded, modulated signal from the user equipment.

In another embodiment the signal comprises received signal values derived from the uplink signal from the user equipment.

The signal may also comprise signal-to-noise plus interference-ratio values derived from the uplink signal from the user equipment.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 3 is a schematic diagram of a CDMA uplink soft-handoff receiver architecture according to the prior art;

FIG. 4 is a schematic diagram of an uplink improved soft-handoff receiver architecture according to the present invention;

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
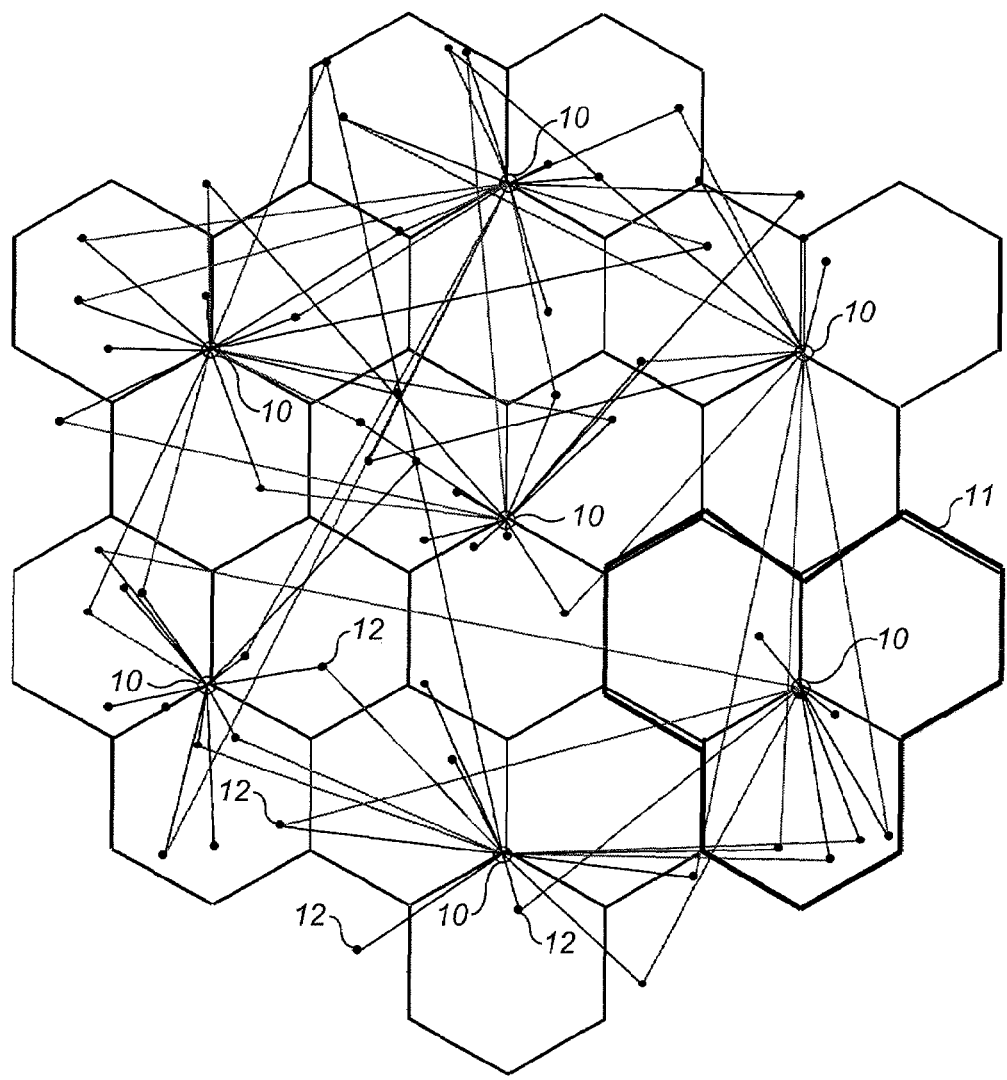
FIG. 1 is a schematic diagram of a cellular communications network illustrating best and second best signal paths from user equipment to basestations.
Figure 2A:
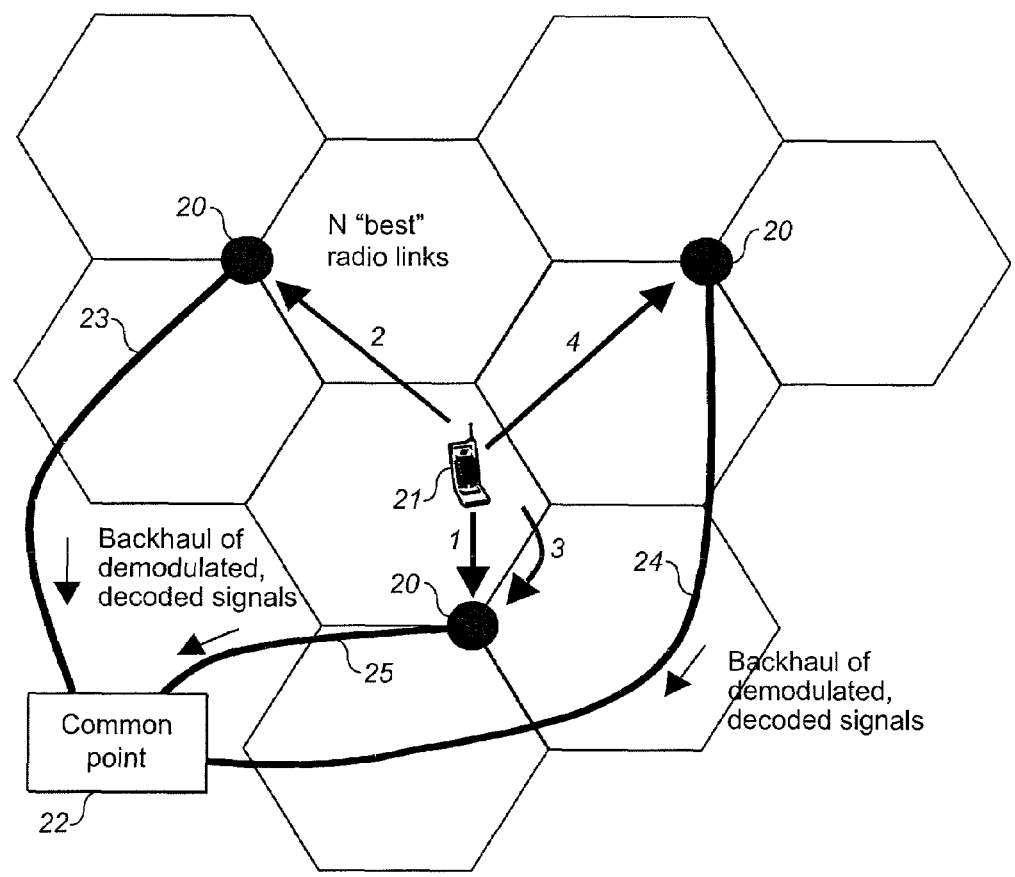
FIG. 2a is a schematic diagram of a wireless communications network in which soft-handoff is implemented according to the prior art.
Figure 2B:
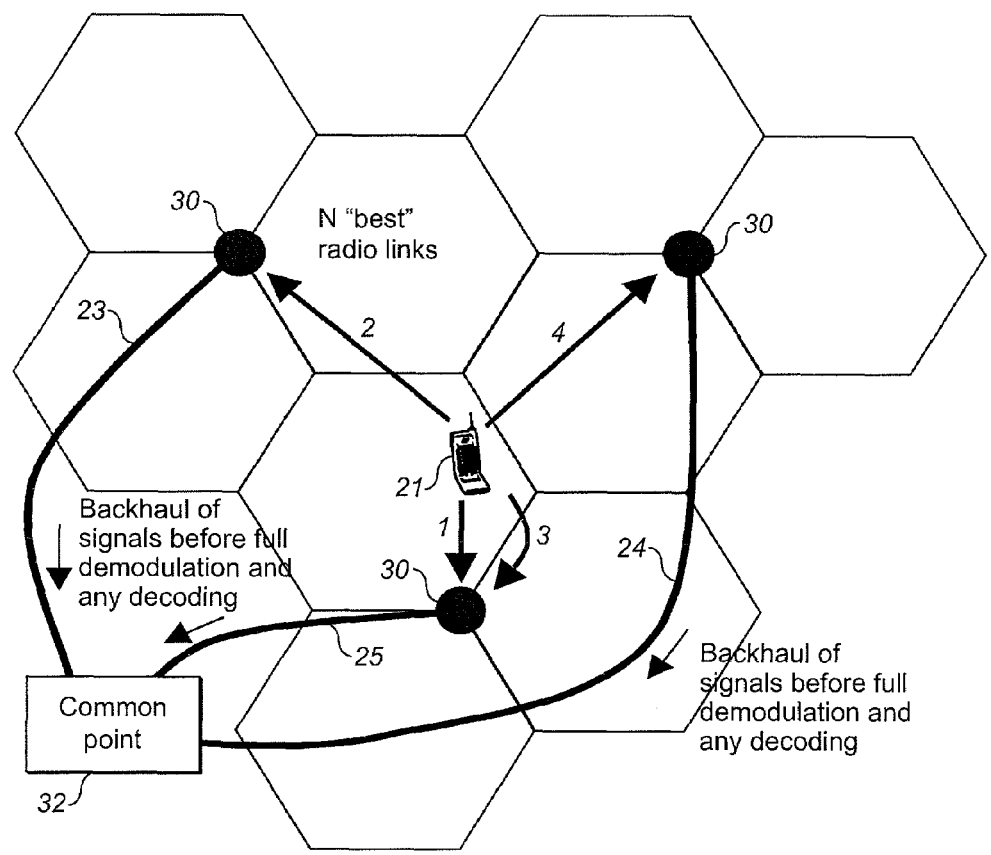
FIG. 2b is a schematic diagram of a wireless communications network in which improved soft-handoff is implemented according to the present invention.

FIG. 2b is a schematic diagram of a wireless communications network in which improved soft-handoff is implemented according to the present invention, FIG. 2b is similar to FIG. 2a however the information that is backhauled comprises the received uplink signals before at least some of the demodulation and all of the decoding process has taken place. That is the basestations 30 do not carry out processing to fully demodulate and decode the uplink signals 1, 2, 3, 4 received from mobile telephone 21. Also, the common point 32 comprises (or is able to access) a processor in order to combine the signals received from the backhaul process (see arrows 23, 24, 25) and then to complete the demodulation process and carry out decoding of those signals.

This is explained in more detail with reference to FIGS. 3 and 4 which show receiver architectures in schematic form for uplink signals received at multiple basestations or basestation sectors. FIG. 3 shows the prior art situation. Each large rectangle 34 represents a different basestation or basestation sector. Within each of those large rectangles 34, i.e. within a basestation or basestation sector, there is provided a receive antenna structure 35 the output of which is provided to a Rake and antenna array processor (AAP) 36. The Rake and AAP processor 36 performs the function of temporal and spatial processing of the user equipment signal on the multiple antennas to improve signal quality and the output of this processor comprises modulation symbols (corrupted by distortion, noise and interference). The output of the Rake and AAP processor 36 is provided to a demodulator 37 which demodulates the received signal and the resulting coded bits are provided to an FEC (Forward Error Correction) decode processor 38. The resulting bit stream of "hard decisions" is backhauled to a common point 39. This is repeated for each basestation or basestation sector at which a signal from a particular UE is received and FIG. 3 illustrates this using the lines 40. At the common point 39 frame selection is carried out as described above for the prior art soft-handoff methods.

The present invention recognises that in the prior art situation (e.g. FIG. 3) useful information is discarded by the basestations or basestation sectors when making their bitwise hard decisions before backhaul. The backhauled information is typically in the form of blocks of decoded data corresponding to each Forward Error Correction (FEC) coded frame. Such a block consists of hard bit-wise decisions (i.e. 1's or 0's), accompanied by a field of Cyclic Redundancy Check (CRC) bits.

The present invention also recognises that there is further loss of useful information during the combining stage of the prior art. In the prior art, the common point or combiner receives a number of alternative decodes from different basestations, all corresponding to the same decoded FEC frame of user data. Some of these decodes may be error-free; some may be in error. The combiner examines the CRC field of each, in order to choose or select between them. The combiner selects, if possible, one of the received frames for which the CRC field is correct. The other received decodes of that FEC frame are then discarded. This constitutes a loss of useful information, and so the ultimate mean Frame Error Rate (FER) is higher then it need be. This means that UEs will need to transmit a high power in order to achieve a required FER threshold. Therefore, the battery life of the UE is reduced, and the ultimate system capacity is lower than it need be due to the increased level of multi-user interference.

The present invention addresses these problems as now explained with reference to FIG. 4. The prior art method discards useful information at both the basestations and the combiner. In the present invention this information is retained at both those stages. This improves the received FER for a given UE transmit power. Therefore the battery life of the UE is improved, and multi-user interference in the network is reduced so that capacity is enhanced.

From FIG. 4 it can be seen that the processing carried out at each basestation or basestation sector (represented by rectangles 44) is much reduced as compared with the prior art situation. Signals are received using an antenna structure 45 but, in one embodiment, only Rake and AAP processing 46 is carried out at the basestations or basestation sectors 44.

The Rake and AAP processor 46 produces received signal points and signal to noise plus interference ratio (SNIR) estimates. These are types of soft symbolwise metrics. In a preferred embodiment the output of the rake and AAP processor 46 is in the form of a single receive signal value (RSV) per received modulation symbol, i.e. a complex number, defined to a required level of quantization and a signal-to-noise-plus-interference-ratio (SNIR) estimate (a real number). The RSV is substantially equal to the superposition of a) the transmitted modulation symbol from the UE (with perhaps some amplitude and phase errors due to distortion in the transmission) and b) some residual error term due to interference and receiver thermal noise. The RSV generation process is repeated at each basestation or basestation sector which receives signals from the particular UE and the results are backhauled to a common point. This is indicated by lines 47 in FIG. 4.

At this stage the backhauled information streams are combined using a combiner 48 as illustrated schematically in FIG. 4. After this combining or selection stage demodulation occurs as known in the art followed by FEC decoding 50 also as known in the art. In a preferred embodiment the backhauled information is combined using Maximal Ratio Combination and after that a single combined demodulation and FEC decoding occurs.

The combiner 48 or common point receives an FEC frame's worth of RSVs and SNIR values from each participating basestation. There may be any number of participating basestations although in a preferred example four are used. The number of RSVs per FEC frame per participating basestation is equal to the number of transmitted modulation symbols per FEC frame. The number of SNIR estimates per FEC frame per participating basestation is a function of the Doppler spread of the uplink propagation channel for the given UE. The combiner carries out the decoding of the FEC frame in the conventional manner, for example, by a) deriving channel soft metrics from the collection of RSVs and SNIR estimates at its disposal, and b) carrying out some suitable form of decoding such as soft-input-soft-output a-posteriori probability (SISO-APP) decoding or the soft output viterbi algorithm (SOVA). Details about SISO-AAP decoding are given in "A soft-input soft-output APP module for iterative decoding of concatenated codes" by S. Benedetto, D. Divsalar, G. Montorsi and F. Pollara in IEE Communications Letters, vol. 1 No. 1, January 1997, pp. 22-24. Details about SOVA are given in "A viterbi algorithm with soft-decision outputs and its applications" by J. Hagenauer and P. Hoeher in Proceedings IEEE Globecom '89, 1989, pp. 1680-1686.

Because the FEC decoder of the present invention is making its decision on the information bits using all of the available information at the network's disposal (i.e. none is discarded), the resultant FER is lower, for a given UE transmit power. Thus, the battery life of the UEs is improved, multi-user interference within the network is minimised, and capacity is maximised. Simulation results described below with reference to FIG. 6 indicate that the capacity gain as a result of using the present invention is of the order of 50% compared to the hard handoff case. This is when using up to 4 basestations as participants in the improved soft handoff process. In effect, the improved soft handoff process completely overcomes the capacity reduction due to the so-called 'Other Cell Interference Factor' (OCIF). The OCIF is estimated to reduce uplink CDMA capacity for hard handoff in an embedded cell (compared to an isolated cell) by some 33%. Note that this 33% capacity reduction estimate assumes a Macrocellular basestation deployment. In certain alternative basestation deployments, such as Microcells or Picocells, the capacity reductions due to OCIF may be even greater. In effect, the process of the present invention reduces the whole CDMA uplink to one single, large isolated 'super-cell'. This has been achieved by sharing information more widely across the whole network.

Figure 5:
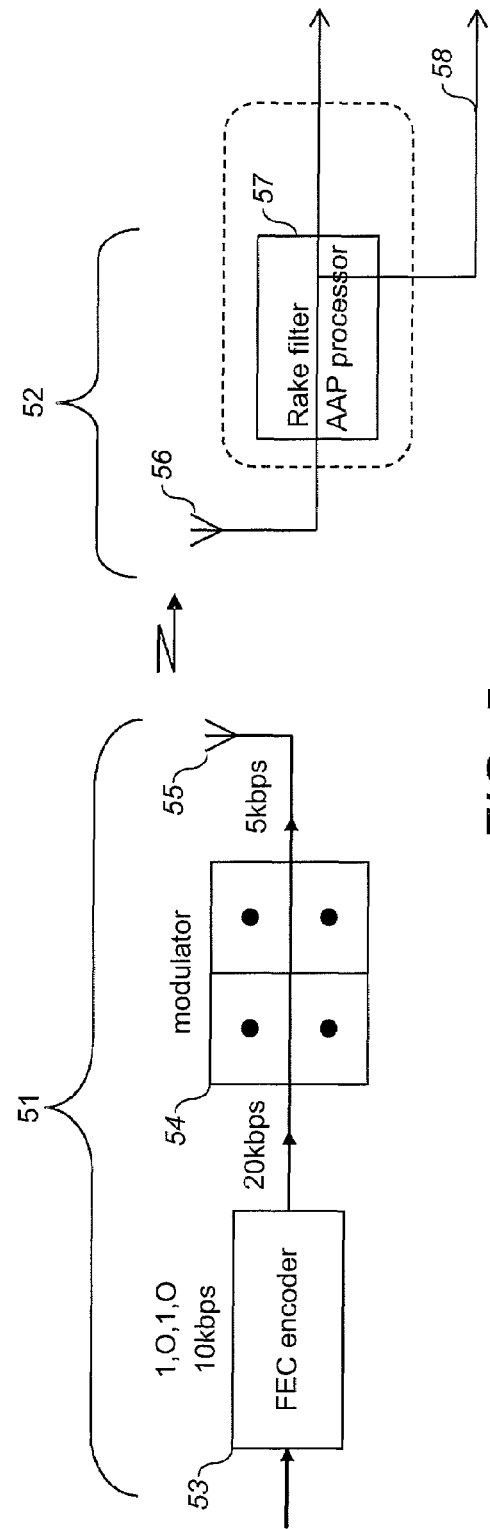
FIG. 5 is a schematic diagram of an improved soft-handoff transmitter and receiver architecture according to the present invention.

FIG. 5 is a schematic diagram of a transmitter and receiver architecture according to the present invention. The transmitter architecture 51 is present at a user equipment and comprises as known in the art an FEC encoder 53 and a modulator 54. After the uplink signal has been processed by both those items it is transmitted using an antenna structure 55. The transmitted uplink is received by a plurality of basestations or basestation sectors and one of these is represented in FIG. 5 by structures 52. A receive antenna structure 56 (which comprises a plurality of receive antennas in order that antenna array processing can be performed) receives the uplink signal and this is then processed using e.g. a rake filter and AAP processor 57 as mentioned above before being backhauled 58 to a common point.

Figure 6:
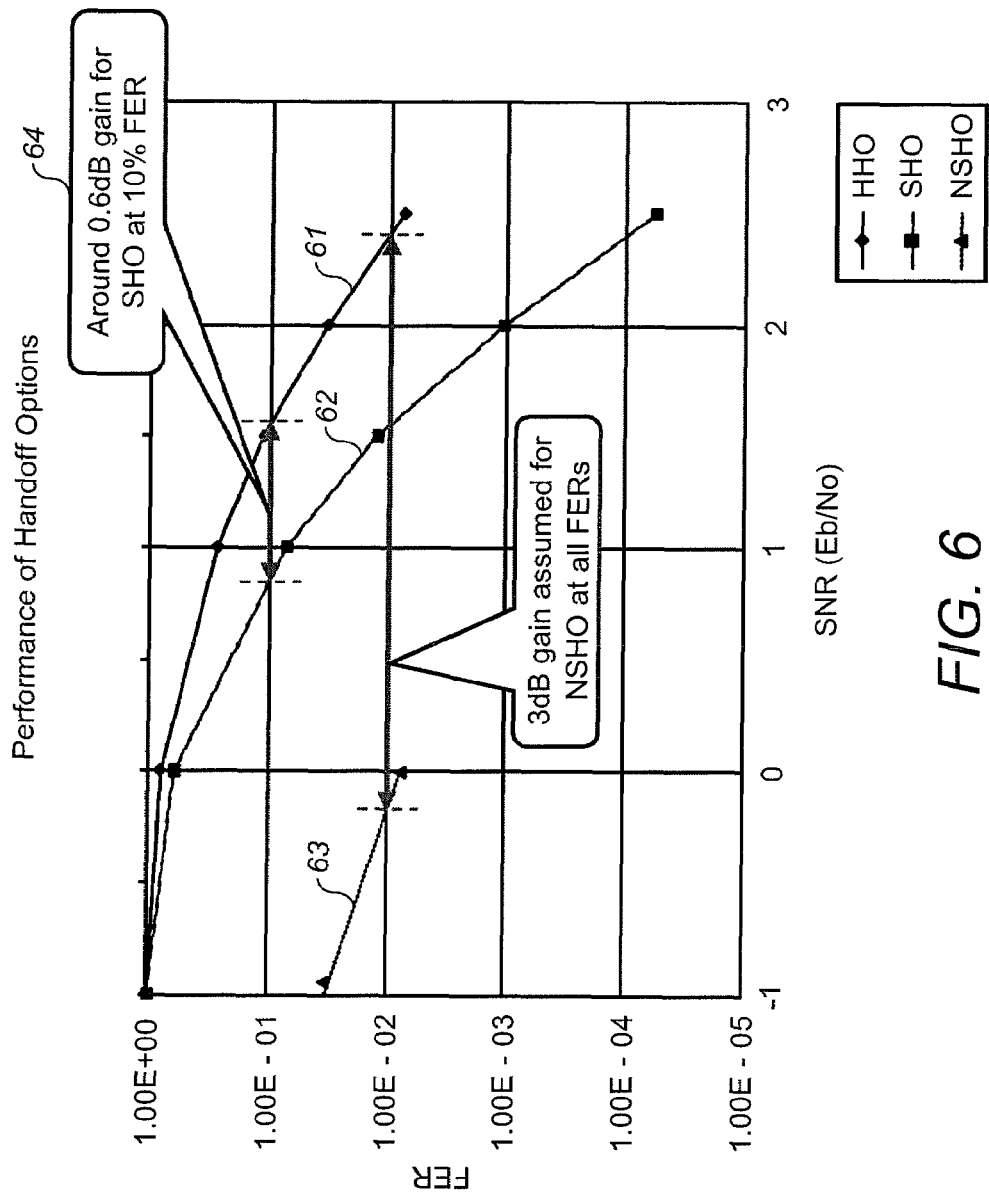
FIG. 6 is a graph of frame error rate (FER) against signal to noise ratio (SNR) for each of hard handoff according to the prior art, soft-handoff according to the prior art and improved soft-handoff according to the present invention.

As mentioned above FIG. 6 shows simulation results. This simulation was carried out to compare the performance of hard handoff (see line 61 in FIG. 6), soft handoff (see line 62) and the improved soft handoff method (see line 63) of the present invention. The simulation used single-path static-channel results A modulation and coding scheme were assumed comprising a ½ rate K=9 convolutional coder, with its binary outputs mapped to QPSK. The curve labelled HHO in FIG. 6 shows this performance result. Reading by eye from that curve we see a 1% FER at approximately 2.4 dB Eb/No and 10% FER at approximately 1.5 dB Eb/No. We assume henceforth that a 10% FER is the target for which we are aiming in a typical uplink traffic channel (e.g. for data transmission).

The static channel results were applied directly for the hard handoff case. For both the soft handoff and improved soft handoff cases we assume that the signal is received with equal power and no small scale fading at two cellsites (i.e. 2-way handoff). For the soft handoff case we assume that the FER after frame selection is equal to the product of the FERs before selection. Applying this rule we see that soft handoff offers about 0.6 dB benefit over hard handoff at 10% FER (see annotation 64 in FIG. 6). For the improved soft handoff of the present invention we assume a gain equal to the gain achievable from Maximal Ratio Combining (MRC) of two equal-power signals, which is 3 dB at all values of SNR. Thus, improved soft handoff offers about 2.4 dB additional gain compared to soft handoff at 10% FER. This therefore allows a 2.4 dB reduction in UE transmit power (i.e. a 0.58× factor) for the same FER assuming a coverage-limited (i.e. noise-limited) edge-of-cell UE.

Figure 7:
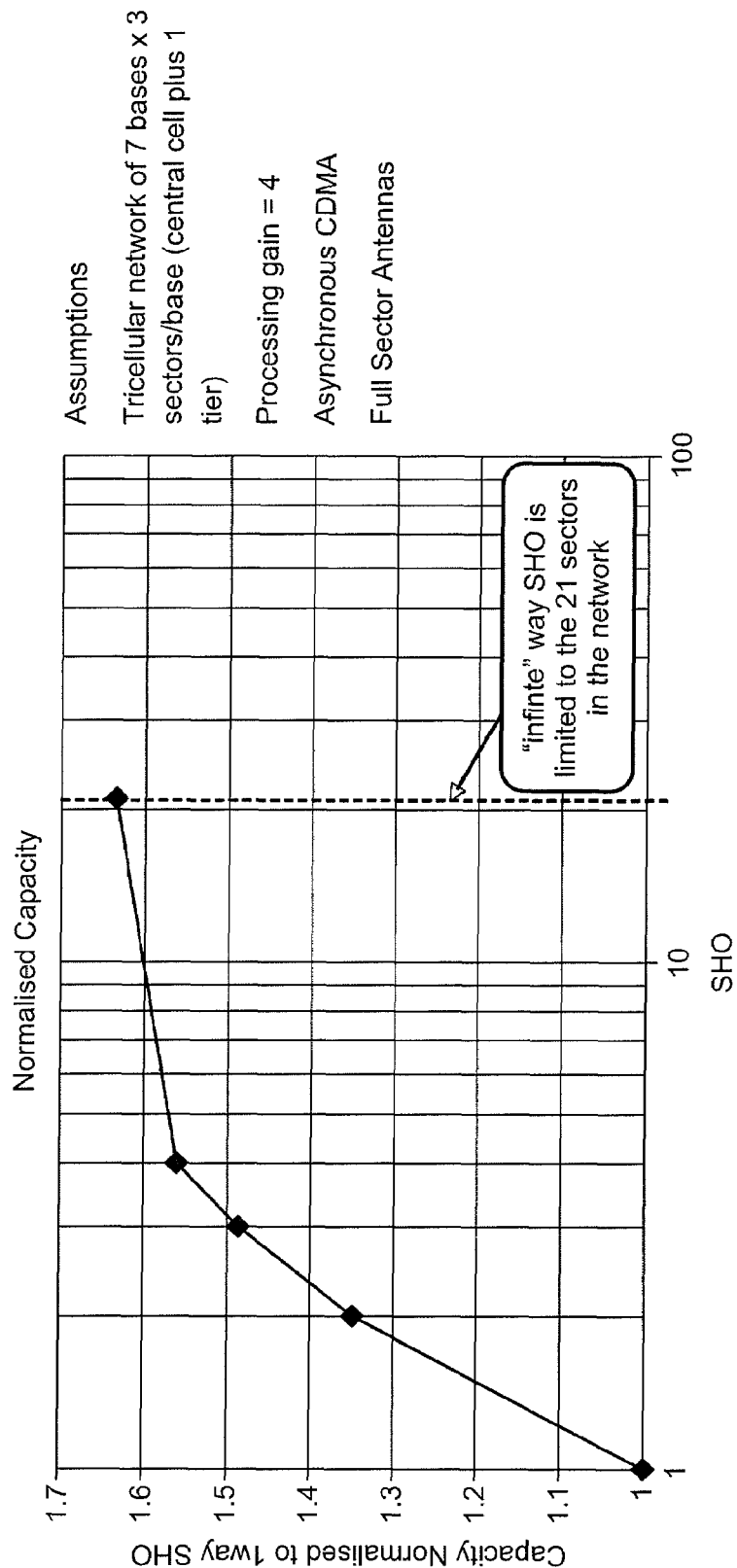
FIG. 7 is a graph of capacity against degree of soft-handoff.

Preferably four basestations are used to backhaul information from a particular UE in the improved soft handoff method of the present invention. From simulation results for soft handoff we found that 4 way soft handoff (i.e. using backhauled information from four basestations or basestation sectors) gave more than 50% benefit over hard handoff and that little further benefit was obtained beyond 4 way handoff. This is illustrated in FIG. 7 which is a graph of simulated capacity normalised to 1 way soft handoff against degree of soft handoff (on a log scale). The simulation was made assuming a tricellular network of 7 bases and 3 sectors per base. The processing gain was set at 4, asynchronous CDMA assumed with full sector antennas. These results are likely to extend to the improved soft handoff method of the present invention and therefore in a preferred embodiment four basestations or basestation sectors are used to backhaul information from a particular UE.

According to another embodiment of the present invention, instead of the temporal and spatial-domain signal processing operations being carried out remotely (at the basestations), the whole aggregate received signal from a remote basestation is transmitted back to a single point using digital or other suitable transmission techniques (e.g. analogue transmission techniques exploiting previously unused 'dark fibre'). This 'Remote Radio' (RR) concept has the advantage of reducing the complexity of the basestations, and allows for even more sophisticated processing of the received signal at the common point.

Also, some of the embodiments described above involve carrying out some demodulation processing at the basestations and the rest at the common point. However, this is not essential. It is also possible to carry out all the demodulation processing at the basestations and none at the common point.

In another embodiment a distributed 'Multi-User Detection' (MUD) process is carried out at the common point. Any suitable MUD process is used for example, as described in "Multi-user detection for DS-CDMA communications", S. Moshavi, IEEE Communications Magazine, October 1996. As known in the art this type of process 'shares' information between the FEC decoders for different UEs. MUD operates by decoding and removing inferior signals from unwanted user equipments. Performing this process at the common point allows improved detection which will increase the effectiveness of MUD.

The backhaul capability in the embodiments described herein can be provided in any suitable manner. For example, optical communications can be used between the basestations and the common point.

Alternatively, the backhaul signals may be sent using wireless communications or in any other suitable manner.

The embodiments described above were discussed with reference to CDMA communications networks. However, the invention is equally applicable to other types of wireless communications networks.

The invention claimed is:

1. A method of receiving backhauled communication signals in a wireless communications network, said signals comprising forward error correction coded frames and said method being carried out at a combiner node in the communications network and said method comprising, the step of;
    (i) receiving backhauled encoded signals from a plurality of basestations in the communications network, said backhauled encoded signals being formed from signals from a given user equipment, wherein said backhauled signals have not undergone decoding prior to reception at said combiner node and wherein said backhauled encoded signals comprise signals received by said plurality of base stations which have been processed to form complex received signal values each representative of a modulation symbol and said backhauled encoded signals have not undergone demodulation prior to reception at said node and wherein said backhauled encoded signals comprise a plurality of signal-to-noise-and-interference-ratio estimates per said coded frame.

2. The method as claimed in claim 1 which further comprises combining backhauled encoded signals received from the plurality of basestations in respect of said given user equipment by using maximal ratio combination to produce one backhauled encoded signal.

3. The method as claimed in claim 1 which further comprises demodulating the one backhauled encoded signal.

4. The method as claimed in claim 2 which further comprises decoding said demodulated, backhauled, encoded signal.

5. A method of backhauling uplink communication signals received from a user equipment in a wireless communications network, said signals comprising forward error correction coded frames and said method being carried out at a basestation in the communications network and comprising the step of:
- (i) receiving uplink encoded, modulated signals from the user equipment in the communications network;
- (ii) processing said received uplink signals to form un-decoded and un-demodulated complex received values representative of a modulation symbol and to form a plurality of signal-to-noise-and-interference-ratio estimates per said coded frame;
- (iii) backhauling the processed signals formed from said received signals to a specified node in the communications network without first decoding and demodulating said received signals.

6. The method as claimed in claim 5 wherein said received signal values and SNIR values are produced subsequent to rake filtering and antenna array processing (AAP) processing.

7. A base station for backhauling uplink communication signals received from a user equipment in a wireless communications network, said signals comprising forward error correction coded frames and said basestation comprising:
- (i) a receiver arranged to receive uplink encoded, modulated signals from the user equipment in the communications network;
- (ii) a processor arranged to process said received uplink signals to form un-decoded and un-demodulated complex received signal values each representative of a modulation symbol and to form a plurality of signal-to-noise-and-interference-ratio estimates per said coded frame;
- (iii) an output arranged to backhaul the processed signals formed from said received signals to a specified node in the communications network without first decoding and demodulating said received signals.

8. A combiner for receiving backhauled communication signals in a wireless communications network, said signals comprising forward error correction coded frames and said combiner being provided at a node in the communications network and comprising:
- (i) an input arranged to receive backhauled encoded signals from a plurality of basestations in the communications network, said backhauled encoded signals comprising signals received by a plurality of base stations which have been processed to form complex received signal values each representative of a modulation symbol and to form a plurality of signal-to-noise-and-interference-ratio estimates per said coded frame, said backhaul encoded signals being formed from at least some signals from a given user equipment; and wherein said backhauled signals have not undergone decoding and demodulation prior to reception at said node.

9. A computer readable medium encoded with computer executable instructions for causing a combiner node to carry out the method of claim 1.

10. A computer readable medium encoded with computer executable instructions for causing a base station to carry out the method of claim 5.

11. A method of backhauling uplink communication signals, said signals comprising forward error correction coded frames, in a wireless communications network comprising a plurality of base stations, a user equipment and a combiner node, said method comprising, at each of the base stations:
- (i) receiving uplink encoded, modulated signals from the user equipment in the communications network;
- (ii) processing said received uplink signals to form complex received values representative of a modulation symbol and to form a plurality of signal-to-noise-and-interference-ratio estimates per said coded frame;
- (iii) backhauling the processed signals formed from said received signals to the combiner node in the communications network without first decoding and demodulating said received signals;

and said method further comprising, at the combiner node:
- (iv) combining each backhauled encoded signal received from the plurality of said base stations in respect of the same user equipment to produce one backhauled encoded signal.

12. A wireless communications network comprising a plurality of base stations and a combiner node, wherein each of the base stations comprises:

a receiver arranged to receive uplink encoded, modulated signals from a user equipment in the communications network, said signals comprising forward error correction coded frames;

a processor arranged to form complex received values each representative of a modulation symbol from the received signals and to form a plurality of signal-to-noise-and-interference-ratio estimates per said coded frame;

an output arranged to backhaul the processed signals formed from said received signals to the combiner node in the communications network without first decoding and demodulating said received signals;

and wherein the combiner node comprises:

an input arranged to receive backhauled encoded signal from the plurality of base stations and to combine each backhauled encoded signal received in respect of the same user equipment to produce one backhauled encoded signal.

* * * * *